US011363758B2

(12) United States Patent
Schlichting et al.

(10) Patent No.: US 11,363,758 B2
(45) Date of Patent: Jun. 21, 2022

(54) WRAPPING DEVICE

(71) Applicant: AGCO International GmbH, Neuhausen (CH)

(72) Inventors: Malte Cornelius Schlichting, Hillerse (DE); Jürgen Borchers, Wolfenbüttel (DE)

(73) Assignee: AGCO International GmbH, Neuhausen (CH)

( * ) Notice: Subject to any disclaimer, the term of this patent is extended or adjusted under 35 U.S.C. 154(b) by 226 days.

(21) Appl. No.: 16/507,289

(22) Filed: Jul. 10, 2019

(65) Prior Publication Data
US 2020/0015421 A1    Jan. 16, 2020

(30) Foreign Application Priority Data
Jul. 10, 2018   (GB) ...................................... 1811265

(51) Int. Cl.
*A01F 15/07*    (2006.01)
(52) U.S. Cl.
CPC .... *A01F 15/071* (2013.01); *A01F 2015/0725* (2013.01); *A01F 2015/0755* (2013.01)
(58) Field of Classification Search
CPC ............ A01F 15/071; A01F 2015/0725; A01F 2015/0755; A01F 2015/074; A01D 87/122
See application file for complete search history.

(56) References Cited

U.S. PATENT DOCUMENTS

| 2,862,597 | A | * | 12/1958 | Priefert | ................ | A01D 87/122 |
| | | | | | | 198/302 |
| 4,641,484 | A | * | 2/1987 | Popelka | ................ | A01F 15/071 |
| | | | | | | 53/399 |
| 5,129,215 | A | * | 7/1992 | Gratton | ................. | A01F 15/071 |
| | | | | | | 53/118 |
| 5,152,125 | A | * | 10/1992 | Laver | .................... | A01F 15/071 |
| | | | | | | 53/210 |

(Continued)

FOREIGN PATENT DOCUMENTS

| EP | 0279871 | A1 | 8/1988 |
| EP | 0394011 | A1 | 10/1990 |

(Continued)

OTHER PUBLICATIONS

European Patent Office, Search Report for Related EP Application No. EP 19 18 4004, dated Nov. 12, 2019.

(Continued)

*Primary Examiner* — Thomas M Wittenschlaeger
*Assistant Examiner* — Katie L Gerth

(57) ABSTRACT

A cylindrical bale-wrapping apparatus includes a main frame having a vehicle mounting apparatus, a first sub-frame adjustably mounted on the main frame between a bale-loading position and a bale-wrapping position, and a second sub-frame adjustably mounted on the main frame between a transport position and a bale-wrapping position. A wrapping table adapted to rotate a cylindrical bale about a central axis is associated with the first sub-frame. A wrapping ring including at least one roll support adapted to rotate about the (Continued)

wrapping table is mounted on the second sub-frame. The second sub-frame has a bale-support element.

9 Claims, 11 Drawing Sheets

(56) References Cited

U.S. PATENT DOCUMENTS

| | | | | |
|---|---|---|---|---|
| 5,799,466 | A | * | 9/1998 | Underhill .............. A01F 15/071 53/399 |
| 6,722,110 | B1 | * | 4/2004 | Royneberg ............ A01F 15/071 100/15 |
| 9,408,349 | B2 | * | 8/2016 | Reijersen Van Buuren ................ A01F 15/071 |
| 2002/0121200 | A1 | * | 9/2002 | Viaud ................. A01F 15/0883 100/70 R |
| 2012/0060444 | A1 | * | 3/2012 | Reijersen Van Buuren ................ A01F 15/071 53/203 |
| 2012/0210886 | A1 | * | 8/2012 | Reijersen Van Buuren ................ A01F 15/071 100/7 |
| 2015/0245563 | A1 | * | 9/2015 | Heaney ................... B65B 35/30 53/52 |
| 2016/0007540 | A1 | * | 1/2016 | Schlichting ......... A01F 15/0883 56/432 |
| 2018/0325033 | A1 | * | 11/2018 | Borchers ................. A01F 21/00 |
| 2020/0022310 | A1 | * | 1/2020 | Schlichting ........... A01F 15/071 |

FOREIGN PATENT DOCUMENTS

| | | | |
|---|---|---|---|
| EP | 1052891 | A1 | 11/2000 |
| EP | 3143868 | A1 | 3/2017 |
| EP | 3403486 | A1 | 11/2018 |
| JP | 2002253042 | A * | 9/2002 ........... A01F 15/071 |

OTHER PUBLICATIONS

UK Intellectual Property Office, Search Report for Related UK Application No. GB1811265.6, dated Jan. 7, 2019.

* cited by examiner

WRAPPING DEVICE

BACKGROUND

Field

The present disclosure relates to an improved wrapping apparatus for an agricultural bale and a method of applying film wrapping to an agricultural bale. In particular the present disclosure relates to the wrapping of agricultural bales deposited on the ground following forming of the bale by a separate baling apparatus. The disclosure has particular application to the wrapping of cylindrical bales, also known as round bales.

Description of Related Art

Wrapping apparatus are known in the art. In known embodiments of such wrapping apparatus, the wrapping apparatus comprises a wrapping table mounted on a frame to support a bale during wrapping, and a wrapping device mounted on the frame to wrap wrapping material about the bale. A loading device is provided to load the bale to be wrapped from the ground onto the wrapping table prior to wrapping of the bale. Typically such loading devices include driven arms or the like to lift an unwrapped bale from the ground surface onto the wrapping table.

Such wrapping apparatus is conveniently connected to a tractor or similar vehicle, for example by a towing apparatus or a three-point hitch.

The present invention provides an alternative solution to the problem of loading a bale from a ground surface onto the wrapping apparatus, in particular where the wrapping apparatus is mounted on a tractor, for example by way of a three-point hitch.

BRIEF SUMMARY

A cylindrical bale-wrapping apparatus comprises a main frame including a vehicle mounting apparatus, a first sub-frame adjustably mounted on the main frame between a bale-loading position and a bale-wrapping position, and a second sub-frame adjustably mounted on the main frame between a transport position and a bale-wrapping position, a wrapping table associated with the first sub-frame, the wrapping table being adapted, when the first sub-frame is in the bale-wrapping position to rotate a cylindrical bale about a central axis, a wrapping ring mounted on the second sub-frame, the wrapping ring including at least one roll support device being adapted, when the second sub-frame is in the wrapping position, to rotate about the wrapping table characterised in that the second sub-frame further comprises a depending bale-support element.

Preferably, at least a portion of the bale-support member is pivotable with respect to the second sub-frame as the second sub-frame is moved between the transport position and the bale-wrapping position.

Preferably, the bale-wrapping apparatus further comprises side elements connected between the main frame and the bale-support element. More preferably, the main frame, the second sub-frame, the bale-support element and the second side elements are in a pantographic relationship with one another.

Preferably, the bale-support element depends opposite the wrapping table when both are in their respective bale-loading positions.

Preferably, the bale-support element is curved.

Preferably, a central axis of the bale-support element is aligned with a central axis of the wrapping table.

Preferably, the bale-support element includes a plurality of rollers. More preferably, the plurality of rollers are free running.

A method of loading a cylindrical bale from a ground surface onto a cylindrical bale-wrapping apparatus according to the first aspect of the invention in which the first sub-frame is in the bale-loading position and the second sub-frame is in the transport position comprises the steps of guiding the cylindrical bale-wrapping apparatus towards a bale such that a surface of the wrapping table is adjacent the bale, causing the second sub-frame to move from the transport positon to the bale-wrapping position, and causing the first sub-frame to move from the bale-loading position to the bale-wrapping position.

Preferably movement of the first sub-frame between the bale-loading positon and the bale-wrapping position causes a bale to be displaced within the second sub-frame.

Preferably movement of the second sub-frame between the transport position and the bale-wrapping position causes at least a portion of the bale-support element to pivot with respect to the second sub-frame.

BRIEF DESCRIPTION OF THE DRAWINGS

The disclosure will now be described, by way of example only, with reference to the accompanying drawings, in which.

DETAILED DESCRIPTION

The disclosure will now be described in the following detailed description with reference to the drawings, wherein preferred embodiments are described in detail to enable practice of the disclosure. Although described with reference to these specific preferred embodiments, it will be understood that the disclosure is not limited to these preferred embodiments. But to the contrary, numerous alternatives, modifications and equivalents as will become apparent from consideration of the following detailed description.

Reference to terms such as front, forwards, rear and rearwards are defined in relation to the wrapping apparatus when attached to a tractor or similar vehicle, the wrapping apparatus being attached at its front to the tractor or similar vehicle.

The wrapping apparatus is substantially symmetrical about a longitudinal axis. Reference to a part on one side will include a reference to a like part on the other side unless stated to the contrary.

Figure 1:
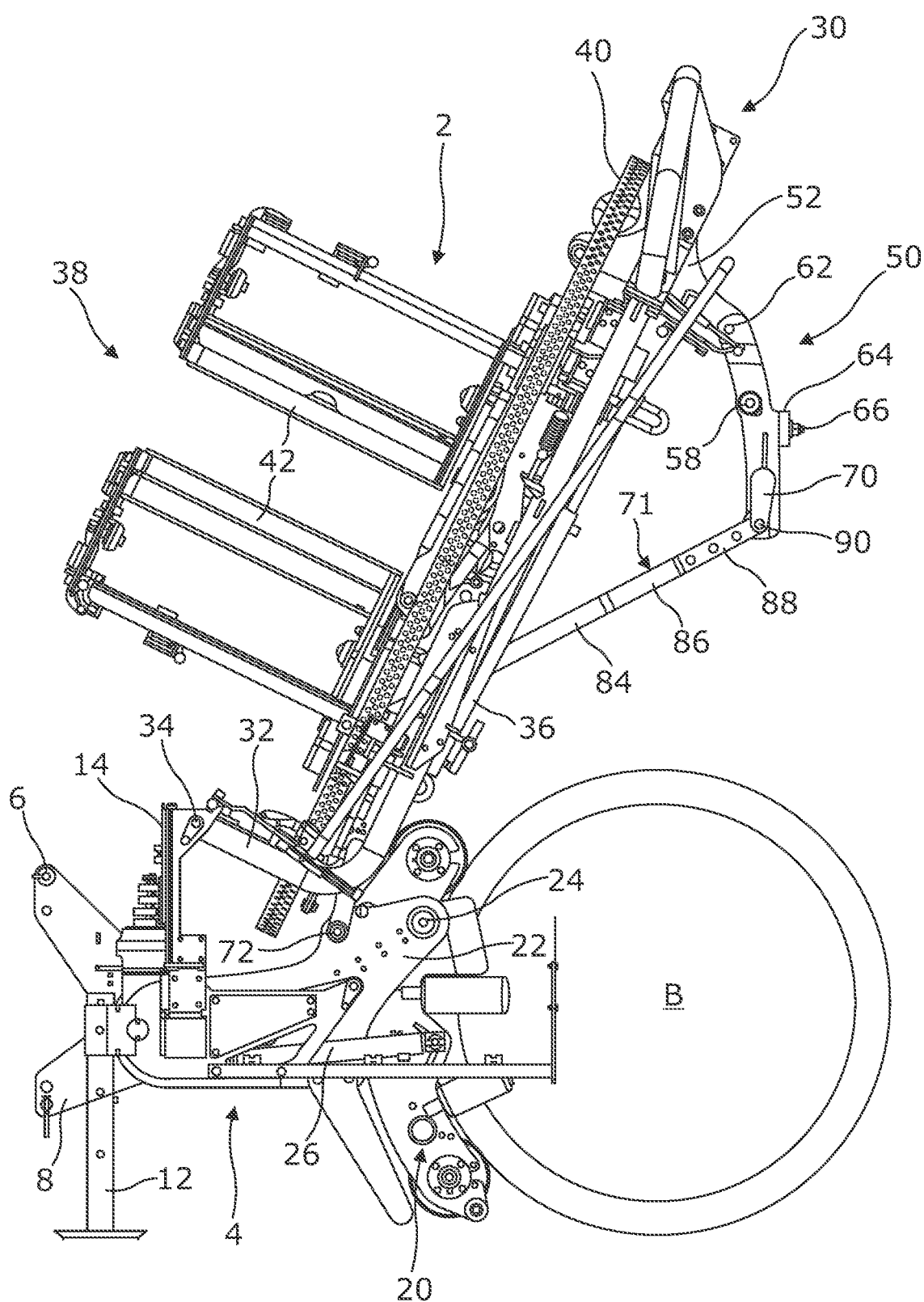
FIG. 1 shows a schematic side view of a wrapping apparatus in accordance with the present disclosure in a first position for approaching a bale to be wrapped.

With reference to the Figures, and in particular FIG. 1, a cylindrical bale-wrapping apparatus 2 is shown adjacent an unwrapped bale B to be loaded into the wrapping apparatus. It will be understood that the unwrapped bale B is lying on a ground surface.

The wrapping apparatus comprises a main frame 4 which incorporates a linkage mechanism for attaching the wrapping apparatus in use to a tractor or similar vehicle for moving the wrapping apparatus over the ground surface. In a preferred embodiment, the linkage mechanism is a three-point linkage, comprising a central upper linkage 6 and left and right hand side lower linkages 8 (best shown in FIGS. 5 and 8).

The main frame 4 also includes mounting means 10 for ground engaging feet 12. The feet 12 will rest on the ground surface when the wrapping apparatus 2 is not attached to a tractor or similar vehicle. When the wrapping apparatus 2 is attached to the tractor or similar vehicle, the feet 12 will be moved and secured in a raised position to prevent inadvertent engagement with the ground surface. For convenience, the wrapping apparatus 2 is shown in each of the Figures with the feet 12 engaging the ground and without a tractor or similar vehicle. One skilled in the art will readily understand that in use the feet 12 will be raised as described above notwithstanding the illustrated position.

A first sub-frame 20 is pivotally attached to the main frame 4. In the illustrated embodiment the main frame 4 is provided at each of the left and right hand sides with a corresponding protrusion 22. The first sub-frame 20 is connected between the two protrusions 22 such that it can pivot about a first pivot axis 24 with respect to the main frame 4. Any suitable means, such as for example, hydraulic cylinders 26 extending between the main frame 4 and the first sub-frame 20, may be used to induce movement of the first sub-frame 20 with respect to the main frame 4.

The first sub-frame 20 incorporates a wrapping table 28 (best seen in FIGS. 5, 7, 8, and 11). The wrapping table 28 is configured to rotate a bale B about a long cylindrical axis of the bale B during wrapping.

A second sub-frame 30 is also pivotally connected to the main frame 4. In the illustrated embodiment, the main frame 4 is provided with left- and right-hand side uprights 14. The second sub-frame 30 is provided at a first end with upturned members 32. The upturned members 32 of the second sub-frame 30 are pivotally connected to the uprights 14 of the main frame 4, such that the upturned members 32 of the second sub-frame 30 can pivot with respect to the main frame 4 about a second pivot axis 34. Any suitable means, such as for example, hydraulic cylinders 36 extending between the main frame 4 and the second sub-frame 30, may be used to induce movement of the second sub-frame 30 with respect to the main frame 4.

The second pivot axis 34 is arranged parallel to the first pivot axis 24.

A wrapping ring 38 is mounted to the second sub-frame 30. The wrapping ring 38 comprises a ring 40 supporting at least one roll support device 42 configured to support a dispenser reel of wrapping material (not shown). In the illustrated embodiment, two such roll support devices 42 are shown. The roll support devices 42 are preferably located in positions on the ring 40 diametrically opposed to one another. The ring 40 is movably supported by a number of rollers mounted on the second sub-frame 30. The ring 40 is rotatable in order to move the roll support devices 42 and, in use, the associated dispenser reels of wrapping material, about a bale B supported on the wrapping table 28.

The second sub-frame 30 may further comprise a non-shown clamping and cutting device between a bale B and the dispenser reels of wrapping material in order to clamp and cut the wrapping material at the end of the wrapping of a bale B.

The second sub-frame further 30 comprises a bale-support element 50 connected at a first end to the second sub-frame 30 as will be described below. The bale-support element 50 depends from the second sub-frame 30. The bale-support element 50 is located at a second end of the second sub-frame 30 opposite the pivot axis 34 of the second sub-frame 30.

At a first end the bale-support element 50 comprises a pair of depending fixed plates 52. The fixed plates 52 are located at an end of the second sub-frame 30 opposite the upturned members 32. First side supports 54 in the form of a laterally extending bracket or similar element connect free ends of the fixed plates 52 to a side of the second sub-frame 30. In the illustrated embodiment, further bracing elements 56 are provided between the laterally extending brackets and the end of the second sub-frame 30 opposite the upturned members 32.

The bale-support element 50 further comprises first left- and right-hand side elements 58, 60. The first side elements 58, 60 are conveniently arcuate in section, providing a generally curved shape to the bale-support element 50. A first end of each of the first side elements 58, 60 is connected for pivoting movement with respect to a free end of a respective fixed plate 52 about a third pivot axis 62. A spacer element 64 connected at each end by a suitable fastening element 66 to a respective first side element 58, 60 assists in holding the first side elements 58, 60 a predetermined distance apart.

Second side supports take the form of laterally extending cross bars 68 connected at a first end towards a second end of the first side elements 58, 60 and extending laterally outwardly. A second end of the second side supports is fixedly connected to a first end of a longitudinally extending side member 70. A second end of the longitudinally extending side member 70 is connected to a second end of a second side element 71 for pivoting movement about a fifth pivot axis 90.

The bale-support element 50 further comprises a number of rollers. Conveniently, each of the rollers is free running. In the illustrated embodiment, a first roller 74 is located between the fixed plates, and second, third, and fourth rollers 76, 78, 80 are located between the side elements 58, 60. The second roller 76 is located between the first ends of the side elements 58, 60. The fourth roller 80 is located between the second ends of the first side elements 58, 60, and the third roller 78 is located between the first side elements 58, 60 intermediate the second roller 76 and the fourth roller 80.

Figure 5:
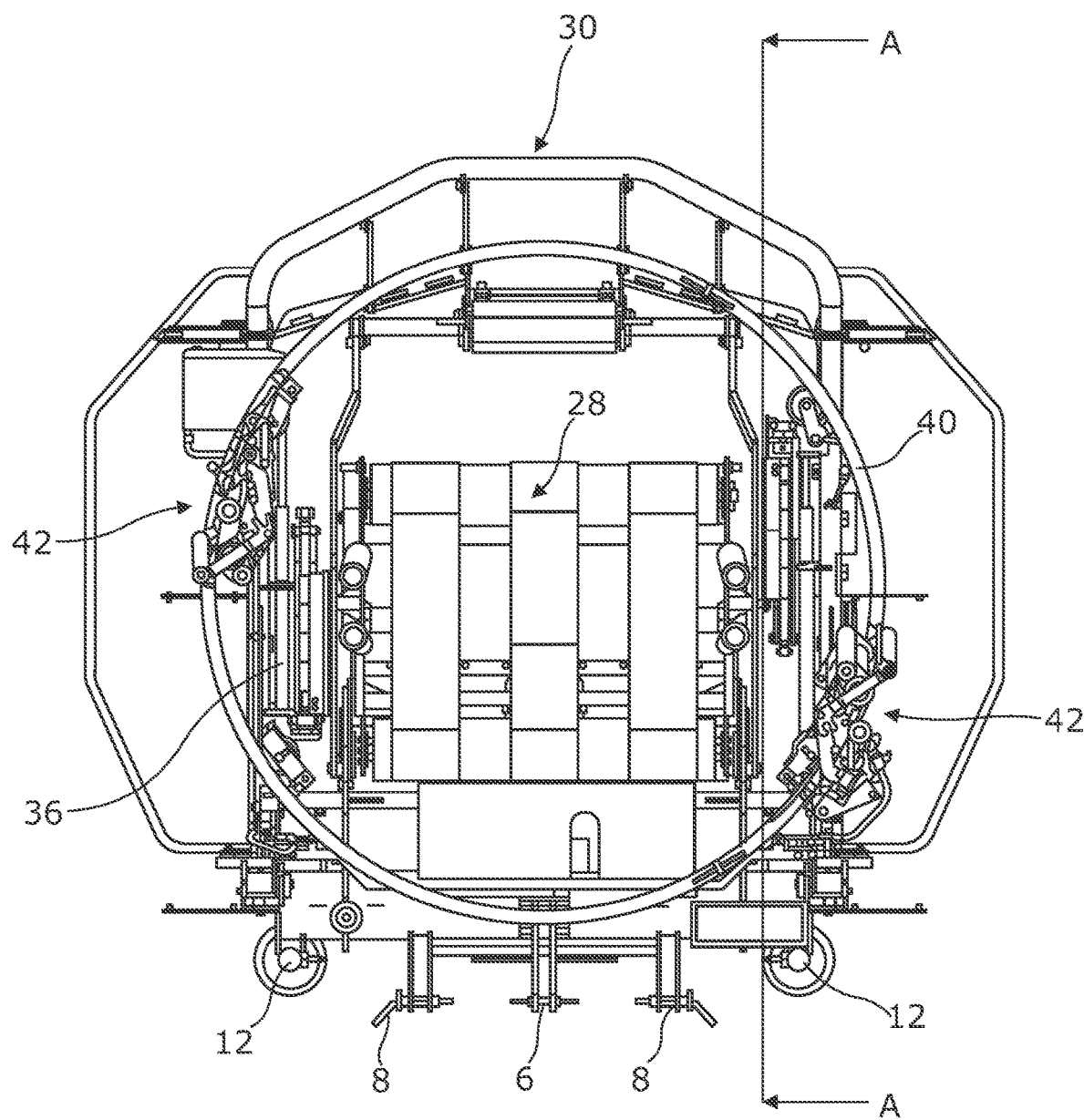
FIG. 5 shows a plan view of the wrapping apparatus shown in FIG. 3.
Figure 6:
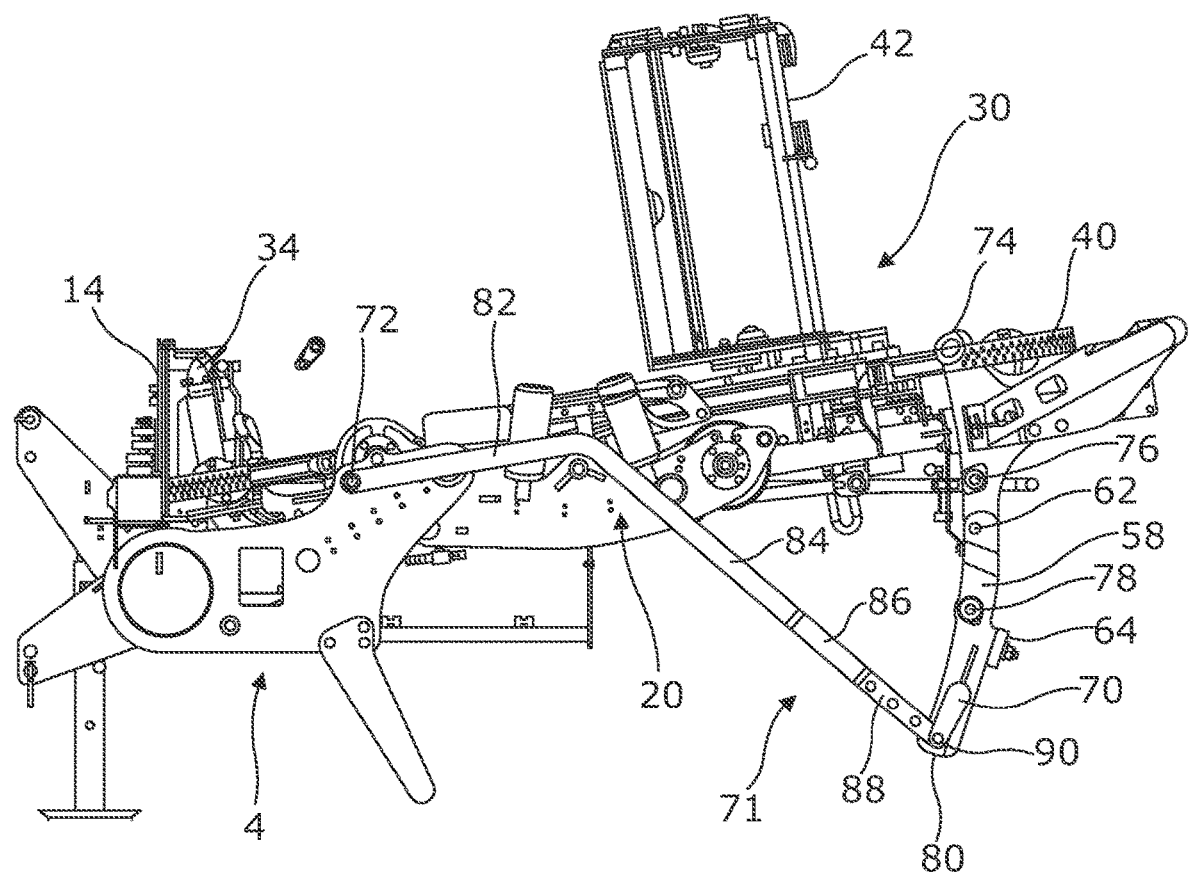
FIG. 6 shows a sectional view of the wrapping apparatus of FIG. 5 along line A-A.
Figure 7:
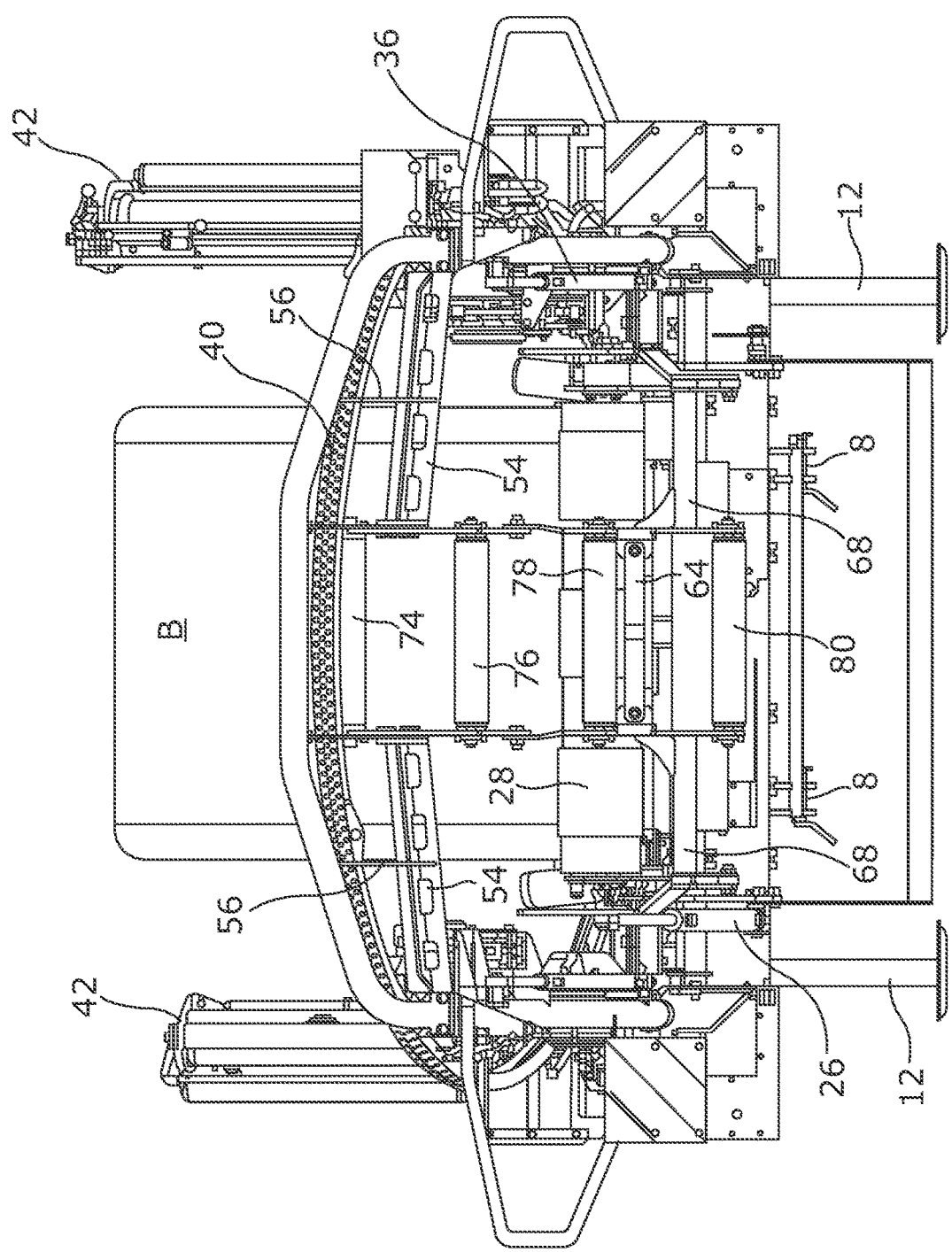
FIG. 7 shows a schematic end view of the wrapping apparatus as shown in FIG. 4.
Figure 9:
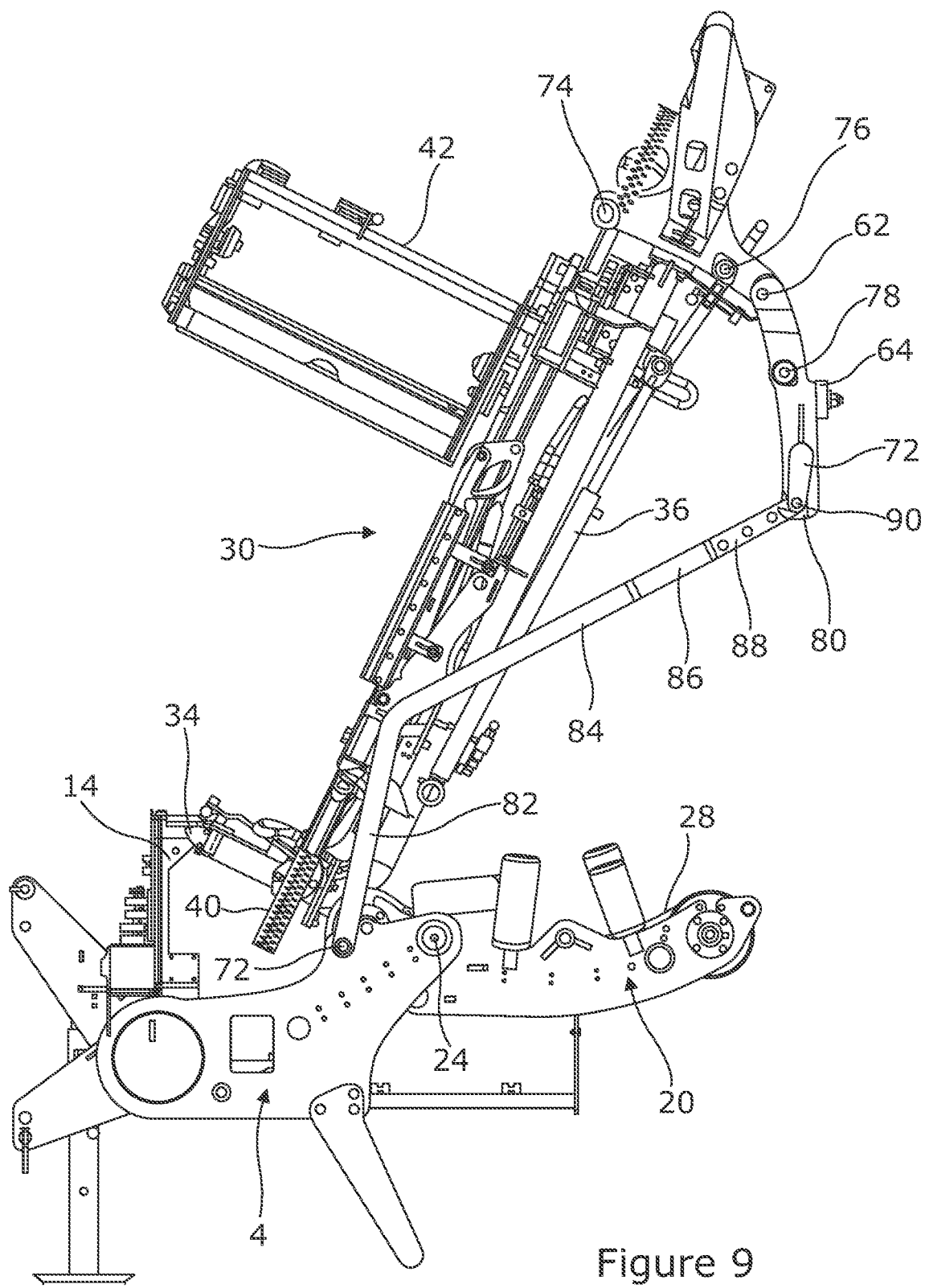
FIG. 9 shows a sectional view of the wrapping apparatus of FIG. 8 along line A-A.

As may best be seen from FIGS. 5, 6, and 9 (in which the bale has been omitted for clarity), each second side element 71 comprises in a side view a generally L-shaped member comprising a relatively shorter first portion 82 extending to a first end and a second relatively longer portion extending to the fourth pivot axis 72 at the second end. The first end of the side member 70 is pivotally connected to the main frame 4 for movement about the fourth pivot axis 72. The second relatively longer portion can be seen to comprise three parts 84, 86, 88. In plan view, it can be seen that the relatively shorter first portion 82 is aligned with a first part 84 of the second relatively longer portion. The first part 84 is laterally offset from the third part 88, the second part 86 being angled between the first part 84 and the third part 88. The free end of the third part 88 is pivotally connected to the second end of the longitudinally extending side portion 71 for pivoting movement about the fifth pivot axis 90.

It can be seen that the second, third, fourth, and fifth pivot axes 34, 62, 72, 90 allow the main frame 4, the second sub-frame 30, the first side elements 58, 60 and the second side elements 71 to act as a four-sided figure of jointed components, similar to a pantograph.

In use, when attached to a tractor or similar vehicle, the wrapping apparatus 2 is guided such that the first sub-frame 20 is adjacent a first side of an unwrapped bale B deposited on a ground surface. As shown in FIG. 1, the first sub-frame 20 is in the loading position and the second sub-frame 30 is in the transport position.

Figure 2:
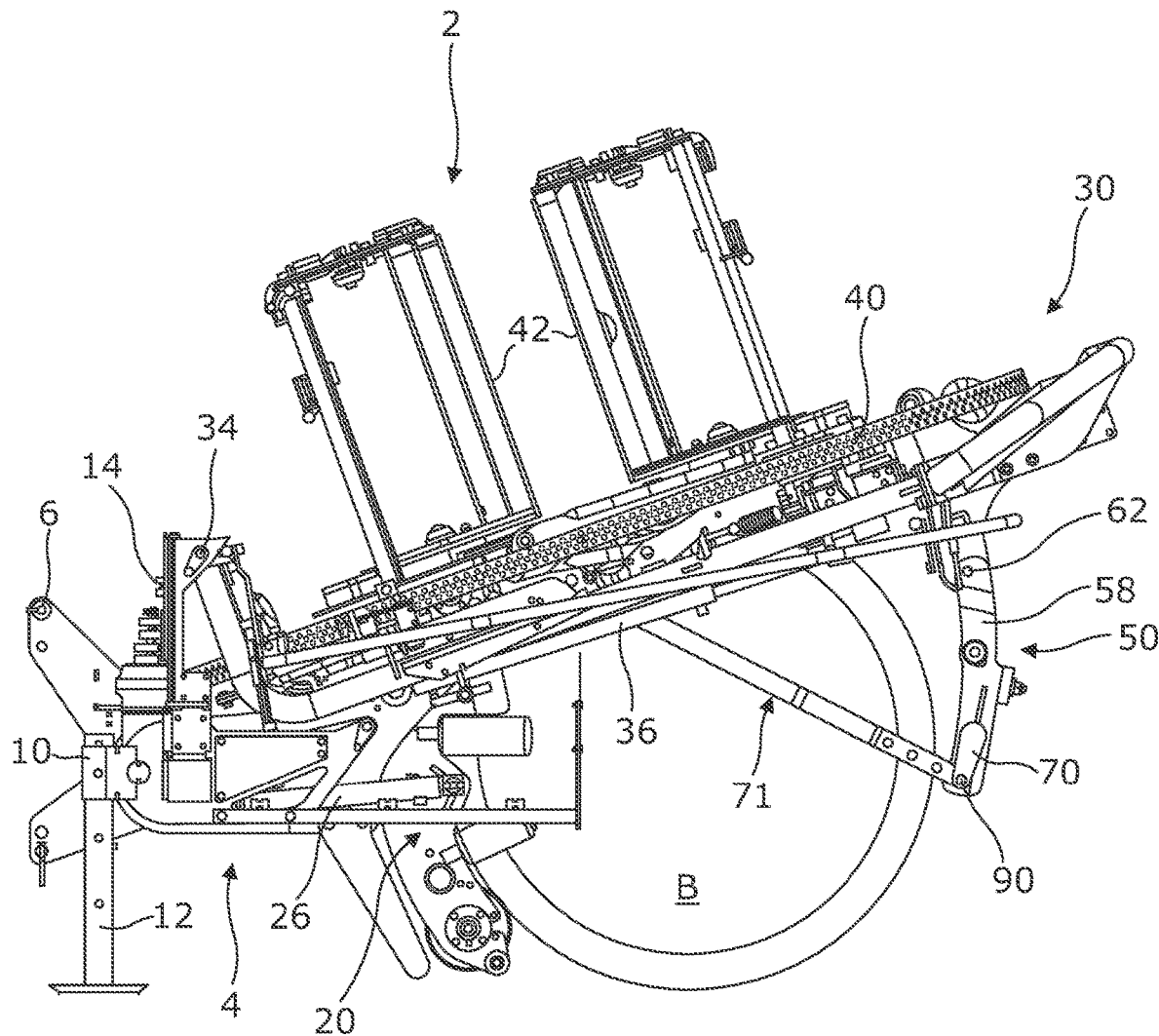
FIG. 2 shows a schematic side view of the wrapping apparatus of FIG. 1 in which a second sub-frame has been lowered.
Figure 3:
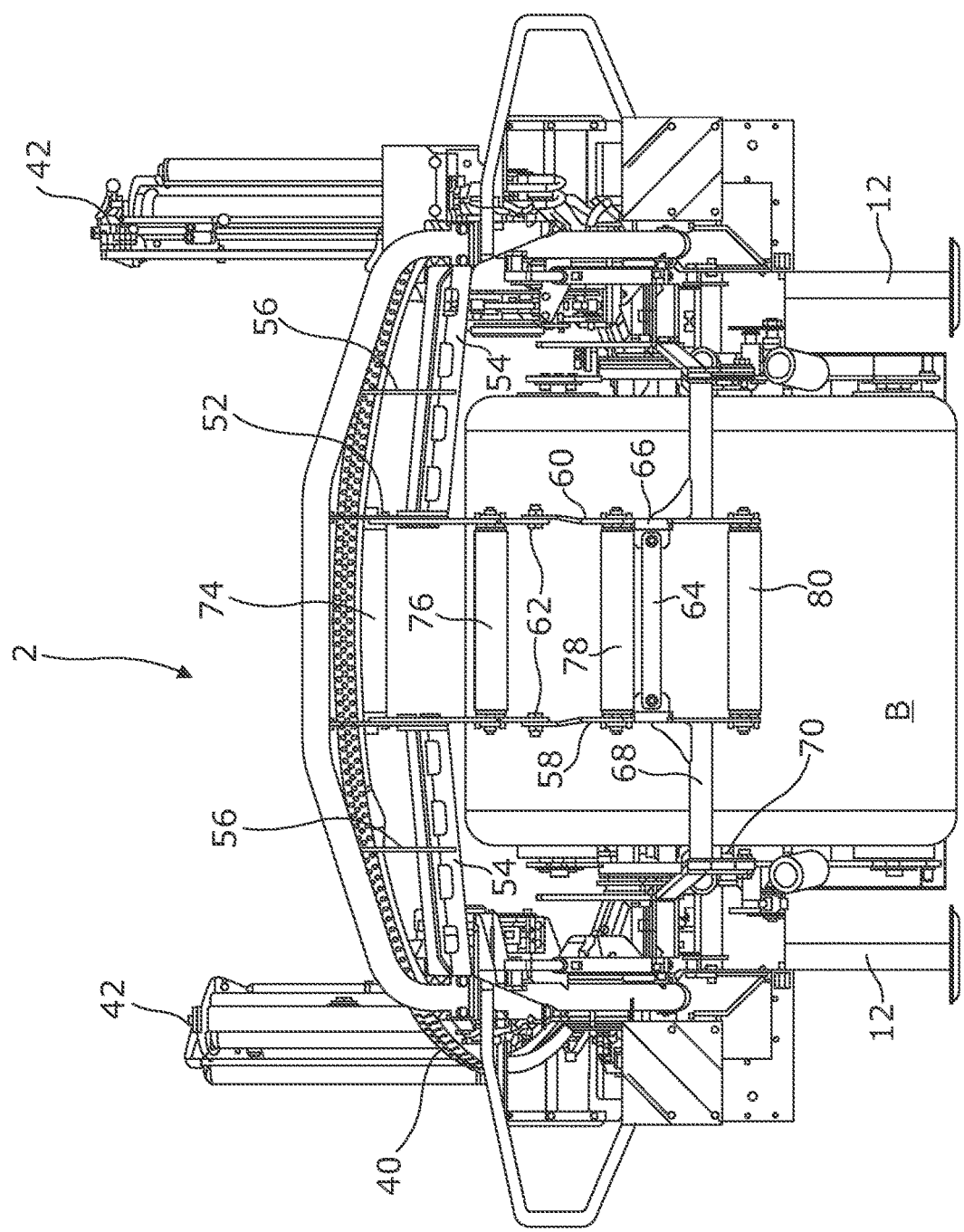
FIG. 3 shows a schematic end view of the wrapping apparatus as shown in FIG. 2.

The second sub-frame 30 is then caused to move downwards such that the bale-support element 50 of the second sub-frame 30 descends adjacent a second side of the unwrapped bale B, as shown in FIGS. 2 and 3. It can been seen that in this position, the bale-support element 50 is disposed on the opposite side of the bale B to the wrapping table 28.

In practice, if the free end of the bale-support element 50, that is a surface of the fourth roller 80, encounters an outer surface of the unwrapped bale B, the bale-support element 50 will nudge the unwrapped bale B towards the first sub-frame 20.

The first sub-frame 20 is then caused to pivot upward the first pivot axis 24 such that the first sub-frame 20 is raised into the wrapping position, moving within the second sub-frame 30. Initially, when this occurs, the bale B is pushed against the bale-support element 50 and its rollers 74, 76, 78, 80. Further movement of the first sub-frame 20 then raises the bale B against the rollers 74, 76, 78, 80 of the bale-support element 50 of the second sub-frame 30. Raising of the bale B is assisted by the curved shape of the bale-support element 50 as well as by the use of free moving rollers.

Figure 4:
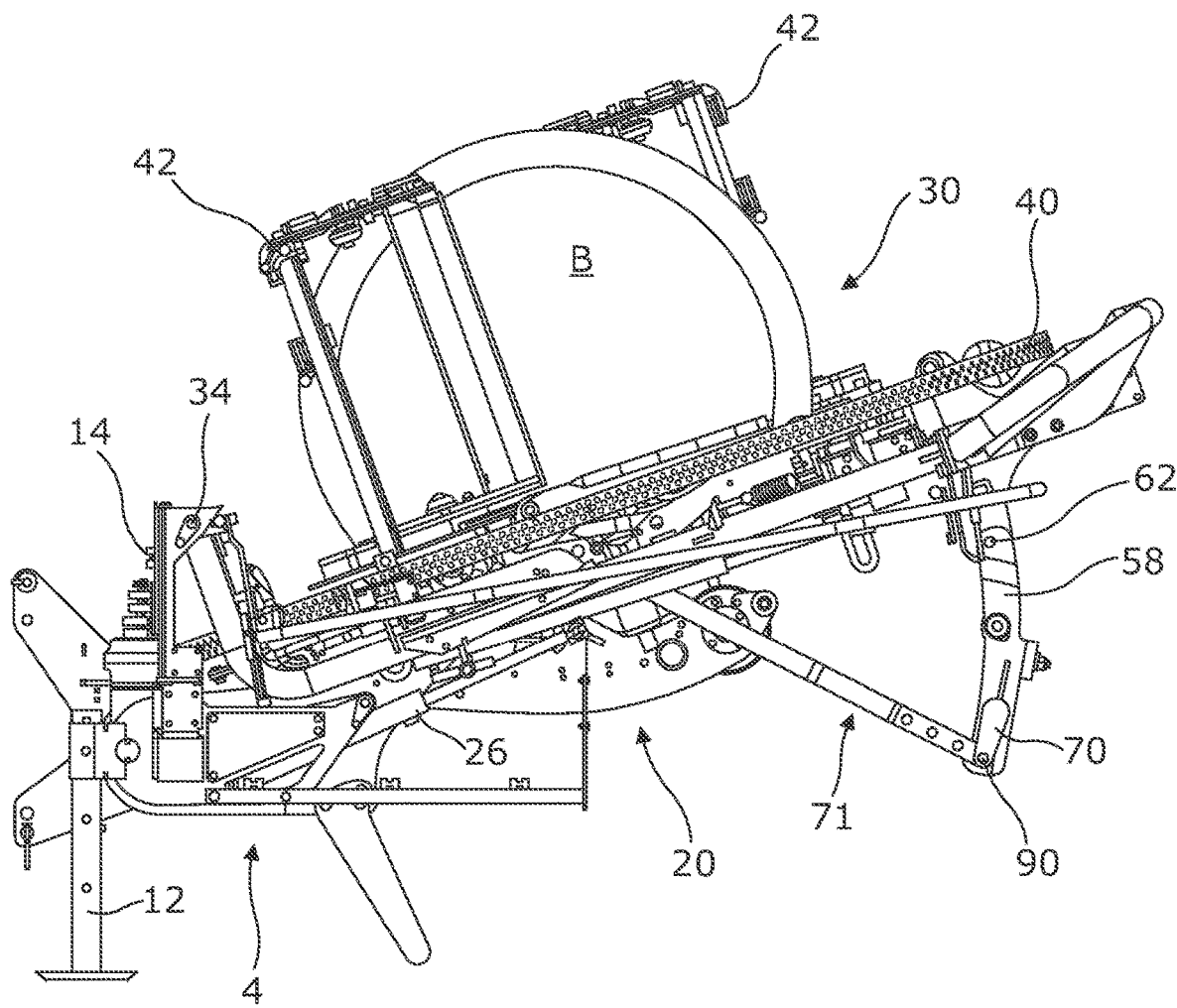
FIG. 4 shows a schematic side view of the wrapping apparatus of FIG. 2 in which a first sub-frame has been raised.

As the movement continues the first sub-frame 20 is raised to the wrapping position (as shown in FIGS. 4 and 5) such that the bale B is now in a suitable position with respect to the roll support devices 42 (and the associated film dispenser reels) to allow wrapping of the bale B to commence.

It is an advantage that the second sub-frame 30 is not provided with any additional driven parts in order for the bale B to be loaded into a wrapping position upon the wrapping apparatus 2.

In their respective wrapping positions, the first and second sub-frames 20, 30 are arranged at an inclination angle with respect to a horizontal plane. As a result, the trajectory of the moving parts of the wrapping apparatus 2, such as the rotatable ring 38 and roll support devices 42, are also inclined at this inclination angle with respect to the horizontal plane.

During wrapping, the inclination angle will be in the range 5 to 45 degrees, preferably between 10 to 30 degrees.

Figure 8:
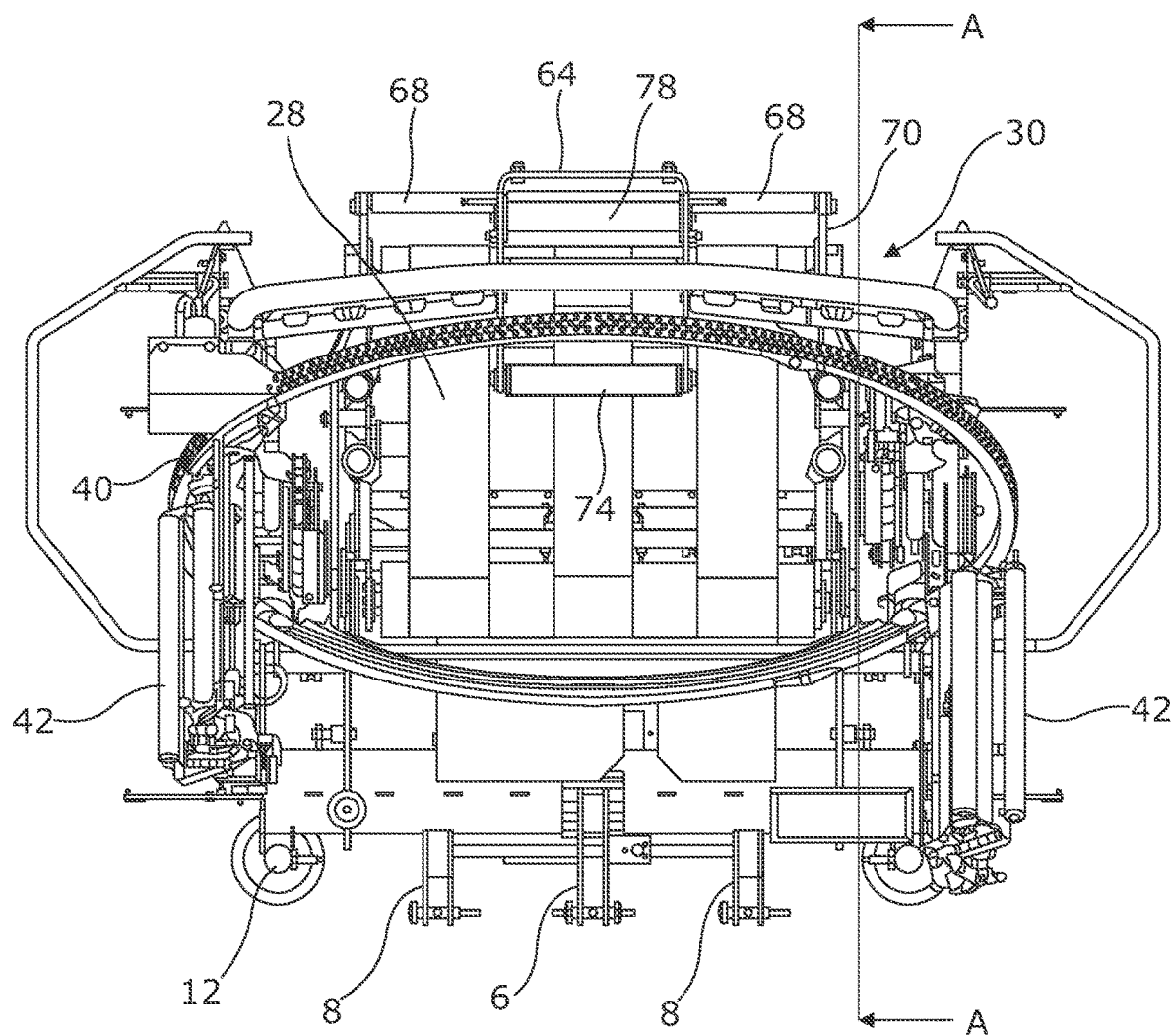
FIG. 8 shows a plan view of the wrapping apparatus shown in FIG. 3 in which the second sub-frame has been raised.
Figure 10:
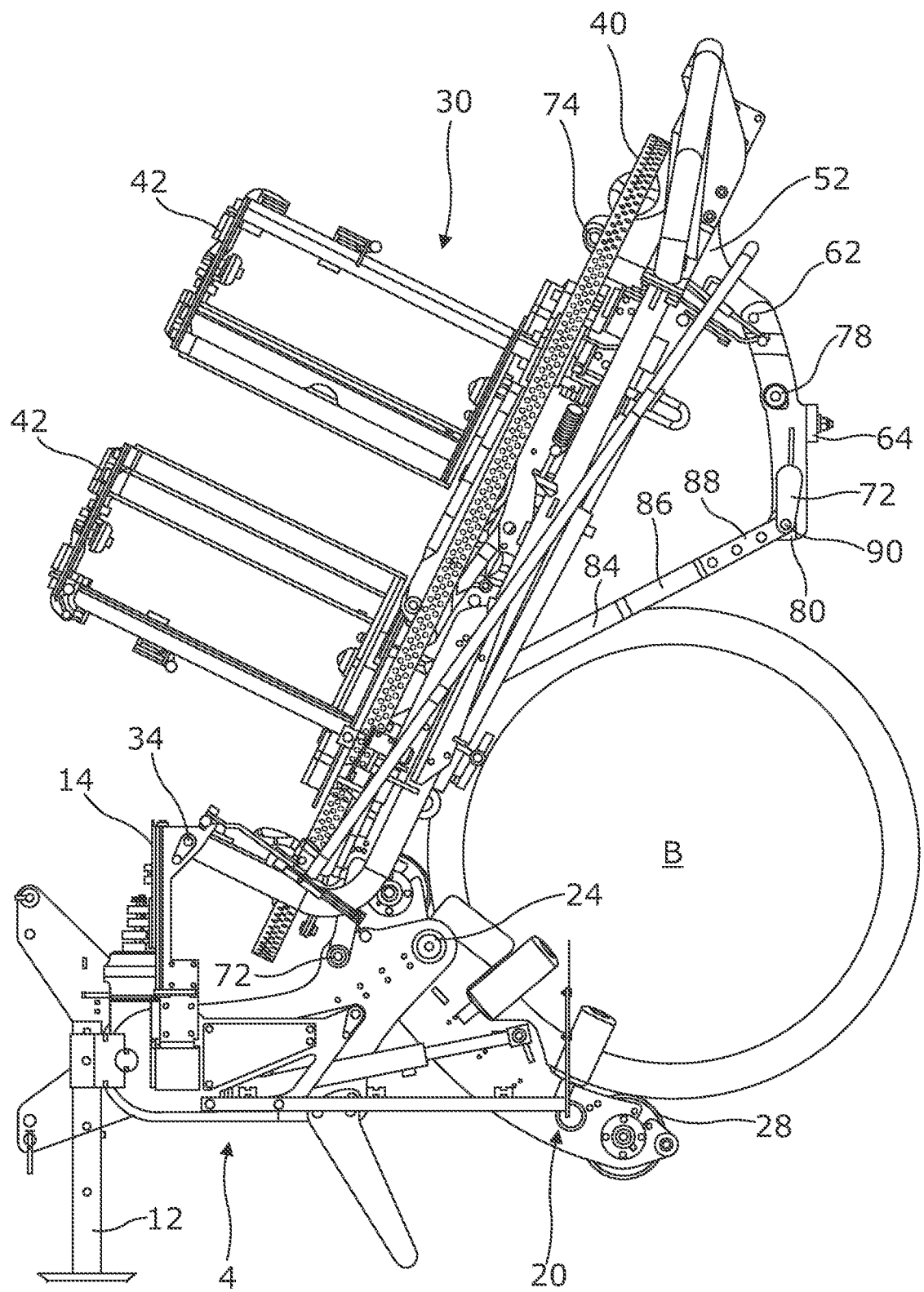
FIG. 10 shows a schematic side view of the wrapping apparatus of FIG. 4 in which the first sub-frame has been lowered and the second sub-frame has been raised.
Figure 11:
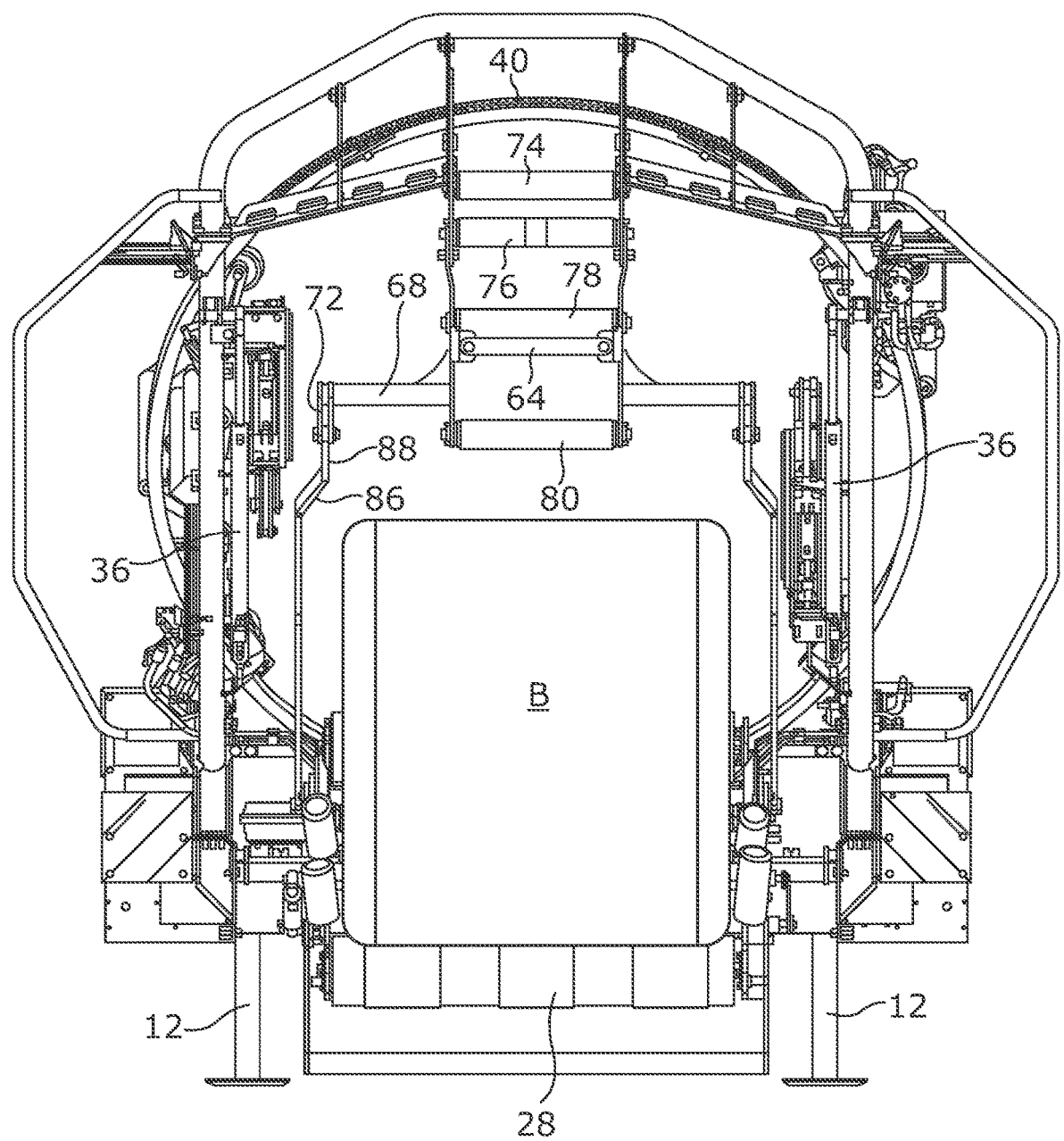
FIG. 11 shows a schematic end view of the wrapping apparatus as shown in FIG. 6.

Once the bale B has been wrapped, each of the first and second sub-frames 20, 30 is once again caused to be pivoted. In a preferred embodiment, the second sub-frame 30 is pivoted upwards towards the transport position (as shown in FIGS. 8 and 9) and, once sufficient clearance for the bottom of the bale-support element 50 has been achieved, the first sub-frame 20 is pivoted down towards the loading position such that a release configuration is achieved (as shown in FIGS. 10 and 11), allowing the wrapped bale B to pass though the wrapping ring 38 and be deposited from the rear of the wrapping apparatus 2.

The wrapping apparatus 2 is then ready to be moved adjacent to a subsequent unwrapped bale deposited on the ground surface and for the process to be repeated. It will be understood that the relative movement of the first and second sub-frames 20, 30 may be controlled depending upon the size of the bale to be wrapped.

As may be seen from FIGS. 3, 5, 7, 8, and 11, in the illustrated embodiment the elongate element 50 is narrower than the wrapping table 28. It may further be seen that the elongate element 50 and the wrapping table 38 are aligned along a longitudinal axis of the wrapping apparatus 2.

From reading the present disclosure, other modifications will be apparent to persons skilled in the art. Such modifications may involve other features which are already known in the field of wrapping apparatus and component parts therefore and which may be used instead of or in addition to features already described herein.

What is claimed is:

1. A cylindrical bale lifting and wrapping apparatus comprising:
 a main frame including a vehicle mounting apparatus;
 a first sub-frame adjustably mounted on the main frame and operable to move with respect to the main frame between a bale-loading position in which the first sub-frame is configured to engage a cylindrical bale resting on the ground and a bale-wrapping position in which the first sub-frame lifts the cylindrical bale off of the ground;
 a second sub-frame having a bale support element mounted thereon, the bale support element extending below the second sub-frame, the second sub-frame adjustably mounted on the main frame, the second sub-frame being operable to move with respect to the main frame between a transport position and a bale-wrapping position;
 a wrapping table associated with the first sub-frame, the wrapping table configured such that when the first sub-frame is in the bale-wrapping position the cylindrical bale rotates about a central axis of the cylindrical bale;
 a wrapping ring mounted on the second sub-frame, the wrapping ring including at least one roll support configured such that, when the second sub-frame is in the bale-wrapping position, the at least one roll support can rotate about the wrapping table.

2. The cylindrical bale lifting and wrapping apparatus according to claim 1, wherein at least a portion of the bale-support element is pivotable with respect to the second sub-frame as the second sub-frame is moved between the transport position and the bale-wrapping position.

3. The cylindrical bale lifting and wrapping apparatus according to claim 1, wherein the bale-wrapping apparatus further comprises first and second side elements connected between the main frame and the bale-support element.

4. The cylindrical bale lifting and wrapping apparatus according to claim 3, wherein the main frame, the second sub-frame, the bale-support element and the first and second side elements are in a pantographic relationship with one another.

5. The cylindrical bale lifting and wrapping apparatus according to claim 1, wherein the bale-support element is opposite the wrapping table when both the bale-support element and the wrapping table are in their respective bale-loading positions.

6. The cylindrical bale lifting and wrapping apparatus according to claim 1, wherein the bale-support element is curved.

7. The cylindrical bale lifting and wrapping apparatus according to claim 1, wherein the bale-support element includes a plurality of rollers.

8. The cylindrical bale lifting and wrapping apparatus according to claim 7, wherein the plurality of rollers are free running.

9. A method of loading a cylindrical bale from a ground surface onto a cylindrical bale-wrapping apparatus comprising a main frame including a vehicle mounting apparatus, a first sub-frame adjustably mounted on the main frame between a bale-loading position in which the first sub-frame is configured to engage a cylindrical bale resting on the ground and a bale-wrapping position in which the first sub-frame lifts the cylindrical bale off of the ground, and a second sub-frame adjustably mounted on the main frame between a transport position and a bale-wrapping position, a wrapping table associated with the first sub-frame, the wrapping table configured such that when the first sub-frame is in the bale-wrapping position a cylindrical bale can rotate about a central axis of the cylindrical bale, a wrapping ring mounted on the second sub-frame, the wrapping ring including at least one roll support and configured such that when the second sub-frame is in the wrapping position, the at least one roll support can rotate about the wrapping table and the second sub-frame having a depending bale-support element mounted thereon, the bale-support element extending below the second sub-frame, in which prior to loading of the cylindrical bale the first sub-frame is in the bale-loading position and the second sub-frame is in the transport position, the method comprising:

guiding the cylindrical bale-wrapping apparatus towards a first surface of the cylindrical bale deposited on the ground surface such that a surface of the wrapping table is adjacent the first surface of the cylindrical bale;

causing the second sub-frame to move from the transport position to the bale-wrapping position adjacent a second side of the cylindrical bale; and causing the first sub-frame to pivot from the bale-loading position to the bale-wrapping position to raise the cylindrical bale from the ground surface and pivot the cylindrical bale within the second sub-frame.

\* \* \* \* \*